United States Patent
Schwunk

(10) Patent No.: US 10,300,920 B2
(45) Date of Patent: May 28, 2019

(54) METHOD FOR VIBRATION DAMPING OF A DRIVE TRAIN BY MEANS OF AN ELECTRIC MACHINE

(71) Applicant: Schaeffler Technologies AG & Co. KG, Herzogenaurach (DE)

(72) Inventor: Simon Schwunk, Freiburg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 98 days.

(21) Appl. No.: 15/520,292

(22) PCT Filed: Oct. 8, 2015

(86) PCT No.: PCT/DE2015/200473
§ 371 (c)(1),
(2) Date: Apr. 19, 2017

(87) PCT Pub. No.: WO2016/070876
PCT Pub. Date: May 12, 2016

(65) Prior Publication Data
US 2017/0334448 A1 Nov. 23, 2017

(30) Foreign Application Priority Data

Nov. 7, 2014 (DE) .......................... 10 2014 222 779

(51) Int. Cl.
*B60W 30/20* (2006.01)
*B60K 6/48* (2007.10)
(Continued)

(52) U.S. Cl.
CPC .............. *B60W 30/20* (2013.01); *B60K 6/48* (2013.01); *B60W 10/08* (2013.01); *B60W 20/00* (2013.01);
(Continued)

(58) Field of Classification Search
None
See application file for complete search history.

(56) References Cited

U.S. PATENT DOCUMENTS 5,361,213 A * 11/1994 Fujieda .............. B60K 31/0008
123/406.38
5,512,024 A * 4/1996 Burton .................. B60W 10/06
477/102
(Continued)

FOREIGN PATENT DOCUMENTS

| DE | 3825138 | 4/1989 |
|---|---|---|
| DE | 19942144 | 6/2001 |

(Continued)

OTHER PUBLICATIONS

DE 19942144 translation (Year: 2001).*

*Primary Examiner* — Timothy Hannion
(74) *Attorney, Agent, or Firm* — Volpe and Koenig, P.C.

(57) ABSTRACT

A method for vibration dampening of a drive train is disclosed. The method includes determining torsional parameters of the drive train via a state controller based on reconstructed torsional parameters of the at least one flywheel mass detected by at least one observer, determining the reconstructed torsional parameters based on disturbances in both (i) a load torque ($M_{last}$) applied at an output of a torque transmission device and (ii) an induced torque ($M_{ind}$) transmitted via the torque transmission device, determining a compensation torque via the state controller based on the reconstructed torsional parameters, and controlling an electric machine via the state controller based on the compensation torque to compensate torsional vibrations.

10 Claims, 2 Drawing Sheets

(51) Int. Cl.
   *B60W 10/08*    (2006.01)
   *B60W 20/00*    (2016.01)
   *B60W 50/00*    (2006.01)

(52) U.S. Cl.
   CPC ........... *B60K 2006/4825* (2013.01); *B60W 2030/206* (2013.01); *B60W 2050/0002* (2013.01); *B60W 2050/0041* (2013.01); *B60W 2510/0638* (2013.01); *B60W 2510/0685* (2013.01); *B60W 2510/081* (2013.01); *B60W 2510/083* (2013.01); *B60W 2510/088* (2013.01); *B60W 2510/1015* (2013.01); *B60W 2710/083* (2013.01); *Y02T 10/56* (2013.01); *Y02T 10/7258* (2013.01)

(56) References Cited

U.S. PATENT DOCUMENTS

| | | |
|---|---|---|
| 6,336,070 B1 | 1/2002 | Lorenz et al. |
| 2005/0247503 A1* | 11/2005 | Imazu ............... B60K 6/445 180/300 |
| 2009/0271099 A1* | 10/2009 | Jones ............... F02D 41/0225 701/115 |
| 2010/0332070 A1* | 12/2010 | Mueller ............... B60W 10/02 701/31.4 |
| 2012/0053770 A1 | 3/2012 | Kretschmer et al. |
| 2013/0311034 A1* | 11/2013 | Falkenstein ............... B60K 6/48 701/33.7 |
| 2014/0109720 A1 | 4/2014 | Werner et al. |
| 2014/0257617 A1 | 9/2014 | Klymenko et al. |
| 2016/0126875 A1* | 5/2016 | Bouheraoua ............ H02P 21/13 318/400.37 |

FOREIGN PATENT DOCUMENTS

| | | |
|---|---|---|
| DE | 102004039756 | 2/2006 |
| DE | 102012209275 | 1/2013 |
| DE | 102011084548 | 4/2013 |
| DE | 102015108067 | 11/2015 |
| EP | 2423065 | 2/2012 |
| GB | 2210181 | 6/1989 |
| GB | 2389428 | 12/2003 |
| WO | 2008040282 | 4/2008 |

\* cited by examiner

METHOD FOR VIBRATION DAMPING OF A DRIVE TRAIN BY MEANS OF AN ELECTRIC MACHINE

BACKGROUND

The invention relates to a method for vibration damping of a drive train comprising an internal combustion engine which has an engine torque applied to a crankshaft, an electric machine, a transmission with a transmission input shaft, and a torque transmission device arranged between the crankshaft and the transmission input shaft, which torque transmission device has at least one flywheel mass capable of vibrating with a moment of inertia and a state controller for controlling the electric machine by a compensation torque compensating for torsional vibrations at the transmission input shaft.

Drive trains with an internal combustion engine and an electric machine are known as hybrid drive trains, in which an internal combustion engine and/or an electric machine contribute torque to drive the vehicle. In such drive trains the internal combustion engine and the electric machine are coupled to each other via a mechanical interface and respectively transfer the applied motor torque (internal combustion engine) and the operating torque (electric machine) via a transmission input shaft to a transmission and from there to the driving wheels. Furthermore, a torque transmission device is provided between the crankshaft of the internal combustion engine and the transmission input shaft, which for example damps torsional vibrations as a torsional vibration damper, can couple and decouple the crankshaft from the transmission input shaft as a friction clutch, and/or transfer the motor torque in some other fashion to the transmission input shaft. Furthermore, the torque transmission device may be coupled in a torque-proof fashion to a rotor of the electric machine at the input side or the output side.

The internal combustion engine is subject to torsional vibrations due to its effective principle, with the drive train and the vehicular body generating the vibrations potentially leading to loss in comfort inside the vehicle, which vibrations are counteracted in a manner known per se via torsional vibration damping devices, such as torsional vibration compensators, flywheel pendulums, or the like. Additionally, rapid changes, for example jumps in the torque of the electric machine or the internal combustion engine, can trigger arbitrary resonance frequencies in the drive train. Therefore, from DE 10 2011 084 548 A1 an active vibration control is known for a hybrid vehicle, in which a reduced drive train model is used.

SUMMARY

The objective of the invention is to advantageously further develop a method for damping vibrations of a drive train in a beneficial fashion.

The objective is attained in the features of the method of the invention.

The suggested method serves to damp vibrations of a drive train comprising an internal combustion engine with a motor torque applied to a crankshaft. Due to the operating principle of the internal combustion engine, for example a diesel or gasoline motor, the motor torque is subject to torsional vibrations. The drive train, being a hybrid drive train, is equipped with an electric machine, which allows the exclusive operation of the vehicle with the internal combustion engine or the electric machine, a hybrid drive operation, a start of the internal combustion engine by the electric machine, the recuperation of mechanical energy into electric energy and its storage device, or the like. Furthermore, a transmission is provided with several automatically shifted or manually engaged gears, automatic shifting gears, or a continuously adjustable transmission with a transmission input shaft. For example, a duplex clutch transmission with two partial transmissions may be provided having two transmission input shafts. A torque transmission device is provided between the crankshaft and the transmission input shaft or shafts, for example formed from a torsional vibration damper, for example a double-mass flywheel, multi-mass flywheel, single-mass flywheel with a downstream arranged rotary oscillation damper, such as a torsional vibration damper comprising a clutch disk, a torsional vibration compensator, such as a centrifugal pendulum on the one side and/or a gear and/or start-of-operation clutch, distributor clutch, and/or the like. The torque transmission device comprises here at least one flywheel mass with a moment of inertia that can oscillate, i.e. be excited by the motor torque to vibrate and/or to compensate vibrations.

The electric machine can be connected directly, or via a clutch in a manner that it can be decoupled, to the crankshaft at the level of the belt pulley or at the transmission side of the internal combustion engine, or be arranged at the output side of the torque transmission device, and thus directly or in a detachable fashion be connected to the transmission input shaft, or be arranged on a flywheel mass of the torque transmission device, for example via respective clutches in a detachable manner in reference to the crankshaft and/or in reference to the transmission input shaft. The electric machine is controlled by a superordinate control unit to provide the drive, start, recuperation function, and the like in order to provide an operating torque. A state controller is provided in order to damp vibrations of the drive train via the electric machine. This controller adjusts a compensation torque of the electric machine at the electric machine, which compensates torsional vibrations at the output of the torque transmission device, for example the transmission input shaft, or in other words changes the damping or also the frequencies of the overall system of the drive train by shifting the vibration eigen-values.

Here, torsional parameters of the drive train that cannot be detected are determined by the state controller as deduced status parameters with the use of at least one observer, which determines the reconstructed torsional parameters of at least one flywheel mass from the velocities or torsional angles detected at the drive train. Here, the reconstructed torsional parameters are determined based on disturbances in the form of a load torque applied to an output of the torque transmission device and a torque induced at the output by the torque transmission device. From the torsional parameters reconstructed by at least one observer the state controller determines the compensation torque and controls the electric machine with it. At least one observer may represent for example an observer according to Luenberger or the like.

It has proven particularly advantageous if by the determination of the compensation torque no interference occurs in the control of the operating torque of the electric machine for driving the vehicle or the recuperation. Accordingly, a determination of the compensation torque occurs separated from the determination of the operating torque. It is then modulated over the operating torque of the electric machine for the hybrid drive of the drive train, for example added thereto.

The torsional parameters provided, fed to at least one observer, may represent angle of rotation, rotational velocity of a flywheel mass, angular difference and/or difference in rotational velocities between two flywheel masses, for example a primary flywheel mass and a secondary flywheel mass of a torsion transmission device embodied as a double-mass flywheel. For example the torsional parameters may be detected directly via sensors allocated to the flywheel masses, for examples at the crankshaft, via sensors for incremental angles allocated to the transmission input shaft, resolvers, or the like. Alternatively or additionally the detection of the torsional parameters may occur indirectly, for example via sensors provided at different locations and connected kinematically to the flywheel masses, for example by wheel speed sensors connected kinematically via a gear ratio of the transmission to the transmission input shaft, or the like. From the torsional parameters in the form of angles, angular differences, differences in angular velocities, and the like here by way of estimation those torsional parameters may be determined that cannot be obtained by way of detection.

The behavior, for example of flywheel masses coupled to each other via a spring device, for example in the form of torsional vibration dampers, such as a double-mass flywheel, cannot be linear.

A linearly designed observer can be used for such non-linearly effective torque transmission devices by determining the torsional parameters depending on the disturbances effective at the driven side in the form of a load torque applied to the transmission input shaft and a torque induced via the torque transmission device. For this purpose an explicit estimate may be provided of disturbances, for example using for them a neuro-fuzzy system to be used by the observer as a known input. Additionally, the disturbances can be decoupled from the remaining system, for example via an unknown input observer, or estimated as statuses, for example by a PI-observer.

According to an advantageous embodiment of the method the estimation of the mean torque transmitted via the torque transmission device can be performed via a neuro-fuzzy system. Here, the torsional parameters of the torque transmission device, for example the angular velocities of the flywheel masses of a double-mass flywheel, can serve as the input parameters, for example the torsional velocities of the primary and the secondary side. Alternatively, assuming periodically repeating non-linearities, a harmonically activated neural network (HANN) can be provided. The advantage of using a HANN is that only the secondary torsional velocity is required. Alternatively the decoupling of the disturbances can be performed by an observer with an unknown input (unknown input observer), for example wheel speeds of the drive parameters or the like. Alternatively the consideration of the disturbances can be performed by a proportional integral observer. When a neural network is used, the interfering torque determined of the torque transmission device, for example a double-mass flywheel, is applied to the input of a conventional linear observer, which can estimate the load torque as a status or suitably decouple it. This observer then determines the missing torque parameters. The method, not based on neural networks, for linearization of the torque transmission device can be integrated already in the observers determining the torque parameters.

In other words, a state controller serves to isolate vibrations of the drive train, controlling the required compensation torque for the active damping of vibrations based on angles of rotation and torsional velocities of the individual torques of inertia of the drive train of the oscillation damping, for example of torsional vibrations, for example of the upper shafts of the internal combustion engine, vibrations caused by torque jumps, and the like. In addition to the observer of the drive train, for example for reconstructing the output of a torque transmission device, such as a double-mass flywheel, on the input of a transmission, such as a transmission input shaft, an observer is provided for the internal combustion engine, particularly its motor torque, and used for controlling the state controller. The monitoring of the motor torque can also be integrated in the observer of the drive train.

Here, by the two observers a so-called X-flywheel is monitored with a number of x flywheel masses that can be excited to oscillations and rotate about an axis of rotation with appropriate torque of inertia. Such X-flywheels include for example the torsional vibration dampers, per se damping oscillations, double-mass flywheels, perhaps in combination with one or more centrifugal pendulums, and other torque transmission devices, for example one-mass flywheels with torsional vibration dampers arranged between the crankshaft and the transmission input shaft, such as a torsional vibration damper integrated in a friction clutch.

The list which is not limiting shows the following observers that can be used here:

Neuro-fuzzy system based on two rotational velocities, preferably the primary and the secondary rotational velocity of a double-mass flywheel, Observers with unknown input (unknown-input-observer) based on two rotational velocities, for example at the driven side, such as the secondary side and the wheel velocity Proportional-integral observer (PI-observer) based on two velocities, for example at the driven side, such as the secondary side and the wheel velocity Harmonically activated neural network (HANN) with only one rotational velocity, for example at the secondary side, Extended Kalman filter, Particle filter, State observer for periodic signals.

Additional motor-specific input parameters can be processed in the observer for the reconstruction of the internal combustion engine, in addition to the torsional parameters, such as the upper dead center (OT), ignition angle, and/or the like.

The observer of the drive train can also be designed for non-linear systems, such as X-flywheels.

Contrary to a disadvantageous speed control via a target torque control, the mechanical vibrations developing by the couplings of the toque of inertia in the rotational system of the drive train are here damped in an improved fashion by the state control. This way, by determining and deducing the rotational parameters, such as angular velocities and angles of distortion, a control unit can advantageously increase the damping and the stiffness of the drive train, particularly of the torque transmission device such as the double-mass flywheel. By controlling to a target torque, preferably the compensation torque of the electric machine, advantageously an active damping can be suggested which allows a simple integration of the vibration damping for example as a subordinate control without this requiring an integration in the overall vehicle control system.

The use of the state control shows additional advantages:

It is a closed control design using one observer,

Eigen-values of the system can be arbitrarily shifted and also directly interpreted physically in case of a suitably simplified analysis, Dynamic advantages are given in reference to conventional controls, In case of implementing state control generally an expansion is possible to a multi-parameter control, By reducing the maximum shaft and air-gap torques in case of guide leaps here an increase of the life span of the drive train is possible by reducing vibrations.

Furthermore, the state control can allow a targeted adjustment of the damping and the stiffness of the system, such as the torque transmission device, and this way reduce the amplitudes in the resonance areas of the drive train. Here, the angles and torsional velocities of the torque of inertia of the underlying X-flywheels and the load torque are estimated by the observer. By the suggested method of an active damping in hybrid vehicles, using the two observers, both leaps of the electric motor as well as the generation of oscillations by the internal combustion engine can be identified and counteracted. Here, the active damping via the electric machine is particularly advantageous by connecting the state controller to an observer, particularly according to Luenberger, a Kalman filter for determining the crankshaft torque, or similar methods.

Based on the estimated speed of the crankshaft of the internal combustion engine the presently given, high-resolution motor torque can be estimated. An expansion of the observer to estimate via a torque transmission device as a non-linear component can here be advantageous.

Alternatively or additionally, from at least one parameter of the internal combustion engine relevant for torsional vibrations, such as a position of the load lever, the upper dead center (OT), and/or the like, the motor torque can be determined, for example its frequency behavior, and used in at least one observer as an input parameter for the preliminary control of the motor torque, for example its frequency behavior deviating from the mean torque. For example, the preliminary control can be combined with an observer of the X-flywheel, reduced by the influence of the torque transmission device, such as a double-mass flywheel. This way, any potentially given non-linearities of the torque transmission device can be omitted. Alternatively or additionally here a status of the torque transmission device detected only stationary, can be overcome by saving the non-linearities of the torque transmission device, for example in the form of a table, in the state controller of the X-flywheel in order to increase the quality of the control. Dependent on the load lever for example a first upper shaft of the internal combustion engine can be saved in a table with reference to the upper dead center (OT), its frequency, and amplitude, and shifted according to a determined OT, such as the measured one. Here, in the torque transmission device in the form of a double-mass flywheel, a friction torque can be saved, effective between the two flywheel masses, and a spring constant of a spring device, effective between the two masses of the flywheel. In order to simplify and improve the state controller, and to form the compensation torque, respectively only the difference in these torsional velocities may be considered which most strongly influences the vibration behavior of the internal combustion engine. This simplifies the design of the controller, however in principle all statuses can be used for controlling purposes.

BRIEF DESCRIPTION OF THE DRAWINGS

The invention is explained in greater detail based on the exemplary embodiments shown in FIGS. 1 to 3. Here it shows.

DETAILED DESCRIPTION OF THE PREFERRED EMBODIMENTS

Figure 1:
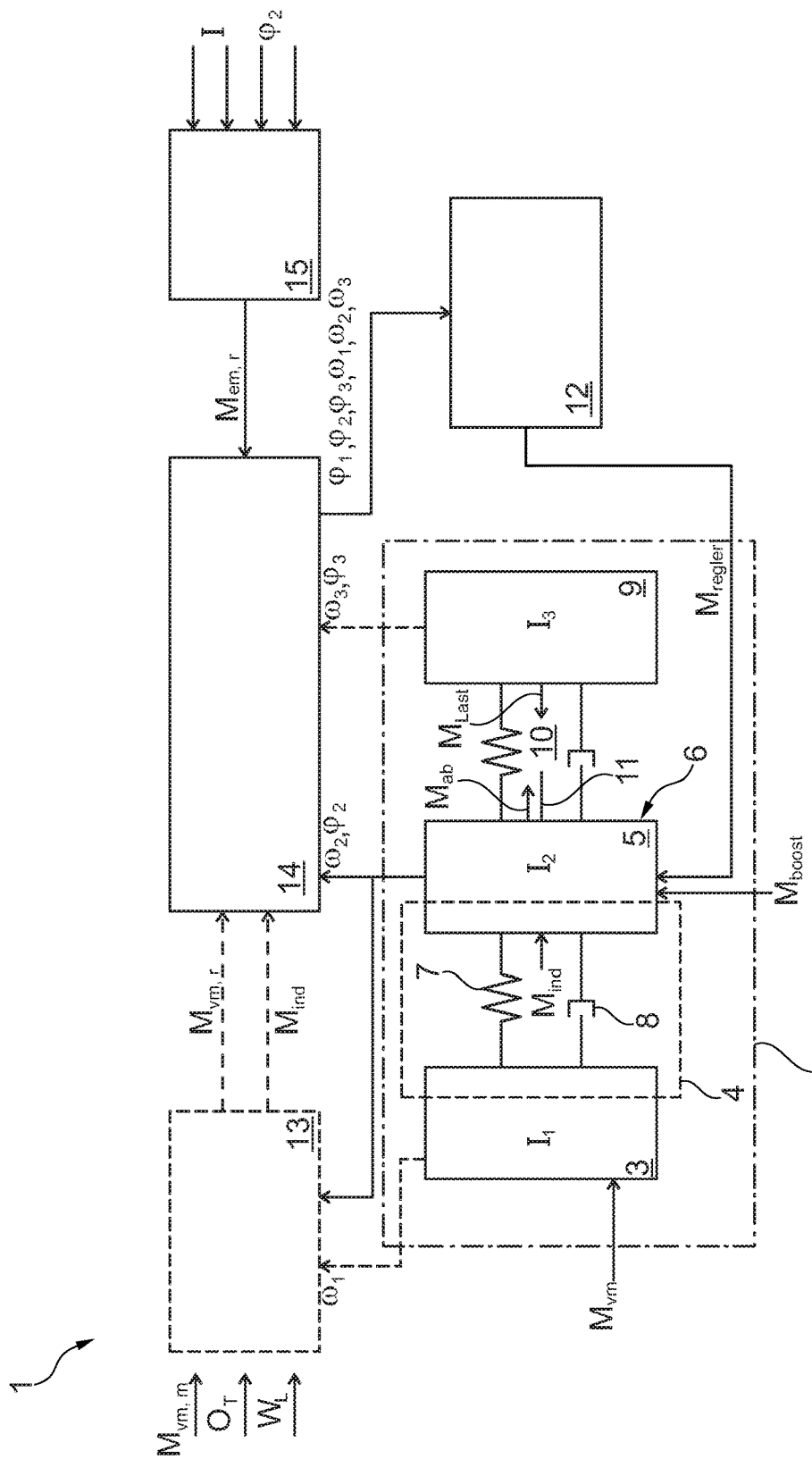
FIG. 1 a block diagram of a drive train with an active torsional vibration damping in various embodiments, FIG. 2 a block diagram to illustrate a reconstructed motor torque transmitted via a torque transmission device, and FIG. 3 a block diagram to illustrate a control and observation system of an active torsional vibration damping.

FIG. 1 shows a block diagram 1 with the drive train 2, shown schematically. The flywheel masses 3, 5, 9 form here an X-mass flywheel with three masses, with the flywheel mass 3 showing an torque of inertia $J_1$ connected to the crankshaft of the internal combustion engine. The flywheel mass 5 with the torque of inertia $J_2$ is elastically and torsionally coupled via the spring device 7 and the friction device 8 to the flywheel mass 3 and forms the torque transmission device 4 in the form of a double-mass flywheel. The torque transmission device 4 is coupled in a torque-proof fashion via the output 11, for example to a transmission input shaft of a transmission or the like, and transmits the output torque $M_{ab}$ to said transmission input shaft. A torsional coupling to the flywheel mass 9 is given by the driving wheels via the coupling 10 with the torque of inertia $J_3$ between the transmission input shaft and the driving wheels. In the exemplary embodiments shown the flywheel mass 5 is rotationally coupled to the rotor of the electric machine 6 or is formed thereby. Together with the internal combustion engine the electric machine 6 forms the hybrid drive of the vehicle, perhaps starts the internal combustion engine, and during braking events of the vehicle recuperates mechanical energy in the form of electric energy. For this purpose the electric machine 6 is controlled via the operating torque $M_{boost}$ by an overall control unit of the vehicle. From the overall control unit, additionally the internal combustion engine is controlled and transfers, depending on its control, the motor torque $M_{vm}$, subject to torsional vibrations, to the flywheel mass 3. By the mechanical control path with the respective system conditions and a perhaps non-linear behavior of the torque transmission device 4 the combination of the motor torque $M_{vm}$ and the electric machine torque $M_{em}$ (FIG. 3) of the electric machine 6 is transmitted as the output.

For the active torsional vibration damping of the drive train 2 the state controller 12 determines the compensation torque $M_{regler}$, which is modulated upon the operating torque $M_{boost}$, for example is impressed thereon, and in the simplest case added thereto. To this extent, the active torsional vibration damping by the electric machine 6 is independent from the overall control of the vehicle and thus can essentially be provided as an additional module for all hybrid drive trains, perhaps even retrofitted.

The state controller 12 is operated with deduced state parameters, such as detectable or reconstructed torsional parameters of the drive train 2, for example angles of rotation $\phi_1$, $\phi_2$, $\phi_3$, torsional velocities $\omega_1$, $\omega_2$, $\omega_3$, and the like of the flywheel masses 3, 5, 9, with the respective angular differences and differential torsional velocities being formed and evaluated thereby. These torsional parameters are generated by the observers 13, 14, 15, with the design, arrangement, and connection of the observers 13, 14, 15 being shown in the form of several embodiments. In a first exemplary embodiment at least the observer 13 serves to reconstruct the internal combustion engine and/or its reconstructed motor torque $M_{vm,r}$ and/or its torsional parameters. This reconstruction occurs here based on the torsional velocities cal of the flywheel mass 3, thus the crankshaft and the torsional parameters such as the torsional velocity $\omega_2$ of the flywheel mass 5, i.e. of the secondary side of the torque transmission device 4 and the corresponding angle of rotation $\phi_2$. Via the reconstructed motor torque $M_{vm,r}$ in the observer 14 the X-flywheel of the drive train 2 is determined, for example depending on its features, such as dynamic and the like, and the load torque $M_{last}$ is identified that is applied at the output, and the torsional parameters of the flywheel masses 3, 5 are reconstructed. The electric machine 6 is identified in the observer 15 via predetermined amperages I, the angle of rotation $\phi_2$, or the like, and the reconstructed electric machine torque $M_{em,r}$ is determined. Here the perhaps given non-linearity of the torque transmission device 4 is displayed in the observer 14. Alternatively the reconstructed motor torque $M_{vm,r}$ can be determined via the mean motor torque $M_{vm,m}$, provided for example via CAN-bus, by way of estimation, a neuro-fuzzy system, a Kalmann filter, or the like.

In a second embodiment, instead of the reconstructed motor torque $M_{vkm,r}$, based on the same input parameters, the torque $M_{ind}$ induced at the flywheel mass 5 is estimated, which serves as the input parameter of the observer 14. In a third embodiment the induced torque $M_{ind}$ is determined via a preliminary control or a similar device from the position $w_L$ of the load lever, the upper dead center OT, and fed to the observer 14.

In a fourth embodiment the observer 13 is omitted and the torques in the observer 14 considered as disturbances or decoupled in the form of induced torque $M_{ind}$ and the load torque $M_{last}$, are identified via the torque parameters allocated to the torque of inertia $J_3$, for example in the form of the angle of rotation $\phi_3$ and/or the torsional velocities $\omega_3$ and decoupled and/or estimated. For this purpose the observer 14 can be embodied as an unknown-input observer or PI observer, for example.

Figure 2:
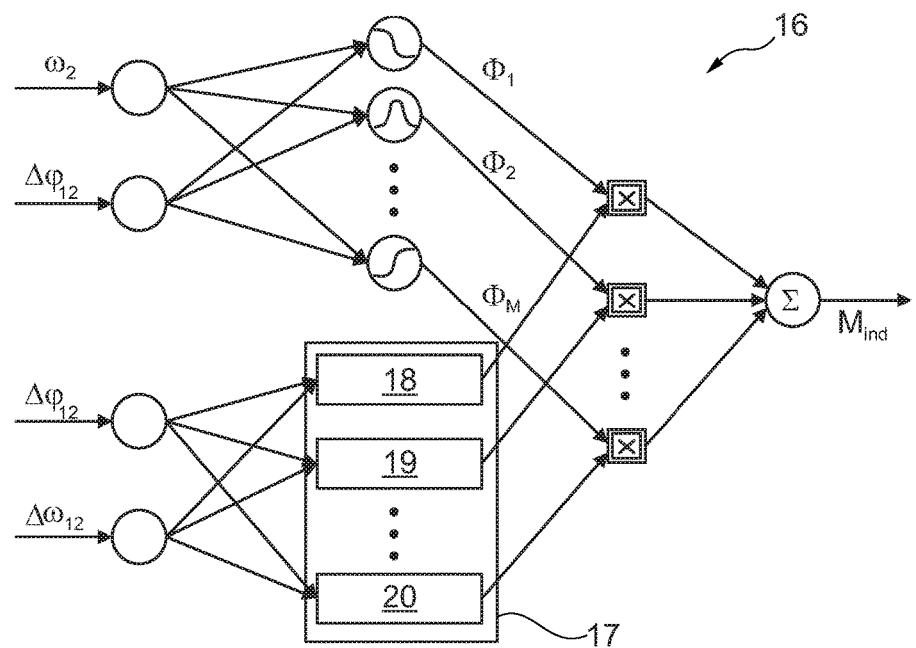

With reference to the block diagram 1 of FIG. 1, FIG. 2 shows the block diagram 16, which illustrates schematically the identification of the torque transmission device 4 embodied as a double-mass flywheel and the reconstruction of the torque $M_{ind}$ induced on the output 11. The reference model 17 of the observer uses the angular difference $\Delta\phi_{12}$ and the different torsional velocities $\Delta\omega_{12}$ between the flywheel masses 3, 5. A linearization is yielded by using a set of local, linear modules 18, 19, . . . 20 in the reference model 17 characterizing the torque transmission device 4 according to the equation $$M_{ind}=c*\Delta\phi_{12}+d*\Delta\omega_{12}$$

with the parameter factors c, d.

Here weighing of the individual modules 18, . . . 20 occurs based on the weighing functions $\Phi_1, \Phi_2, \ldots \Phi_M$ via the input parameters of the torsional velocity $\omega_2$ of the flywheel mass 5 and the angular difference $\Delta\phi_{12}$ of the two flywheel masses 3, 5. Alternatively, for example as a model, the following transmission function can be used of the torque transmission device $$\hat{y}_i(\underline{u})=w_{i,0}+w_{i,1}*u_1+w_{i,2}*u_2+w_{i,3}*u_1^2+w_{i,4}*u_2^2+w_{i,5}*u_1*u_2$$

with the input parameters $u_1, u_2$ being used, for example the angular differences $\Delta\phi_{12}$ and the different torsional velocities $\Delta\omega_{12}$ (FIG. 2) and the parametering factors $w_{i,0}, w_{i,1}, w_{i,2} \ldots w_{i,5}$.

Figure 3:
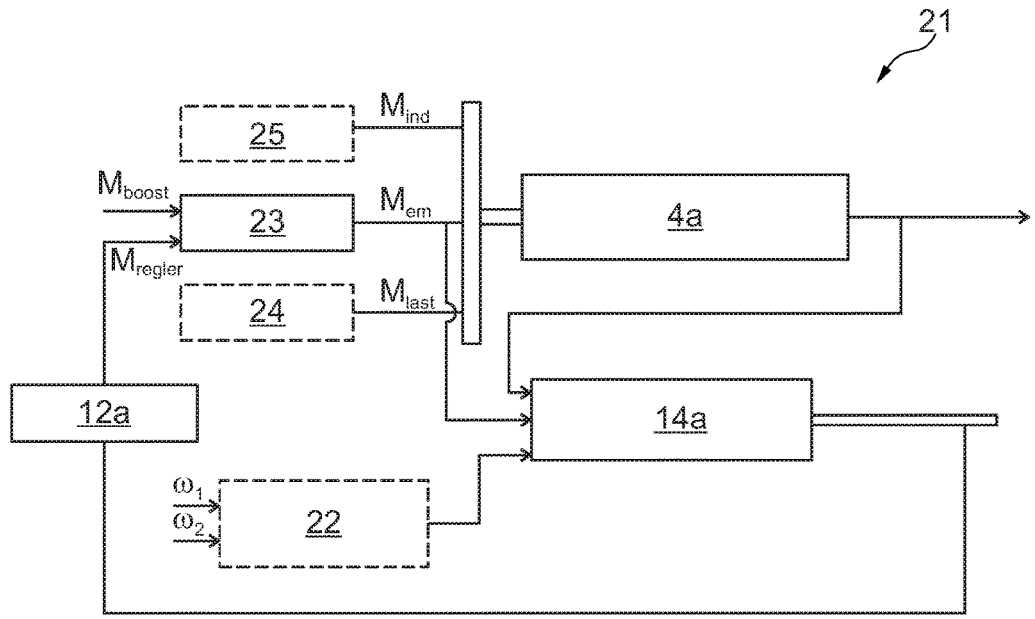

FIG. 3 shows the block diagram 21, in which the observer 14a is embodied as a linear observer in different variants to identify the drive train, which perhaps behaves not linear due to the torque transmission device 4a, and to reconstruct their reconstructed torsional parameters. The inputs of the observer 14a include the block 23 from the operating torque $M_{boost}$ and the compensation torque $M_{regler}$ formed from the electric machine torque $M_{em}$. In a first embodiment the neuro-fuzzy system 22 performs the non-linear estimate, processing as input parameters the torsional velocities $\omega_1$, $\omega^2$ of the flywheel masses of the torque transmission device, thus the primary and secondary side of a double-mass flywheel. The state controller 12a generates the compensation torque $M_{regler}$ from the torsional parameters of the observer 14a according to the state controller 12 and the observer 14 of FIG. 1. Here the motor torque $M_{vkm}$ transmitted via the torque transmission device 4a is identified as the interfering input and fed as the input parameter to the observer 14a. Here, an appropriate parametering of the state controller 12a allows a free input of system features, for example frequencies, damping factors, and the like of the torque transmission device. In another embodiment, using the linear observer 14a and waiving the neuro-fuzzy system 22, assuming a periodically occurring non-linearity in a predetermined torsional angle, a harmonically activated neural network can be trained. Here for each operating state the progression of the torsional parameters of the torque transmission device is determined preferably offline, i.e. for example before the use of the active torsional vibration damping, and for example saved as a table such that every operating state can be recalled in real time during operation and used for controlling the compensation torque. As an input parameter for the HANN here a torsional parameter at the secondary side is sufficient, for example the torsional velocity of a double-mass flywheel at the secondary side.

In another embodiment, waiving the neuro-fuzzy system 22, the observer 14 can be provided with unknown inputs (unknown-input observer), for example the load torque $M_{Last}$ and the induced motor torque $M_{ind}$. They are considered as unknown disturbances via methods of control technology. Two torsional parameters at the output side serve as unknown input parameters in the unknown-input observers to decouple the disturbances, for example torsional velocity at the secondary side and a wheel speed of the driving wheels. Here, for example the wheel velocity signals of the driving wheels can be used transmitted via the CAN-bus and subject to a reaction time.

Accordingly, the linear observer 14a can be designed as a PI-observer according to an unknown-input observer. Unlike this one, in the PI-observer the disturbances are estimated as conditions instead of the disturbances being decoupling.

LIST OF REFERENCE CHARACTERS

1 Block diagram
2 Drive train
3 Flywheel mass
4 Torque transmission device
4a Torque transmission device
5 Flywheel mass
6 Electric machine
7 Spring device
8 Friction device
9 Flywheel mass
10 Coupling
11 Output
12 State controller
12a State controller
13 Observer
14 Observer
14a Observer
15 Observer 16 Block diagram
17 Reference model
18 Module
19 Module
20 Module
21 Block diagram
22 Neuro-fuzzy system
23 Block
24 Block
25 Block
I Amperage
$J_1$ Torque of inertia
$J_2$ Torque of inertia
$J_3$ Torque of inertia
$M_{ab}$ Induced motor torque
$M_{boost}$ Operating torque
$M_{ind}$ Induced torque
$M_{em}$ Electric machine torque
$M_{em,r}$ Constructed electric machine torque
$M_{last}$ Load torque
$M_{regler}$ Compensation torque
$M_{vm}$ Motor torque
$M_{vm,r}$ Reconstructed motor torque
$M_{vm,m}$ Reconstructed motor torque
OT Upper dead center
$w_L$ Load lever setting
$\Delta\phi_{12}$ Angular difference
$\Delta\omega_{12}$ Difference of torsional velocity
$\Phi_1$ Weighing function
$\Phi_2$ Weighing function
$\Phi_M$ Weighing function
$\phi_1$ Torsional angle
$\phi_2$ Torsional angle
$\phi_3$ Torsional angle
$\omega_1$ Torsional velocity
$\omega_2$ Torsional velocity
$\omega_3$ Torsional velocity

The invention claimed is:

1. A method for vibration damping a drive train including an internal combustion engine, the method comprising:
providing a state controller, at least one observer, and a torque transmission device arranged between a crankshaft and a transmission input shaft, the torque transmission device including at least one flywheel mass having a predetermined moment of inertia;
determining torsional parameters of the drive train based on reconstructed torsional parameters of the at least one flywheel mass detected by the at least one observer,
determining the reconstructed torsional parameters based on disturbances in both (i) a load torque ($M_{last}$) applied at an output of the torque transmission device and (ii) an induced torque ($M_{ind}$) transmitted via the torque transmission device,
determining a compensation torque based on the reconstructed torsional parameters, and
controlling an electric machine via the state controller based on the compensation torque to compensate torsional vibrations.

2. The method according to claim 1, further comprising modulating the compensation torque ($M_{regler}$) upon an operating torque ($M_{boost}$) of the electric machine.

3. The method of claim 1, wherein the at least one flywheel mass includes a plurality of flywheel masses.

4. The method according to claim 3, further comprising:
processing at least one torsional parameter of the torsional parameters, wherein the at least one torsional parameter is at least one of:
an angle of rotation ($\phi_1$, $\phi_2$, $\phi_3$) of at least one flywheel mass of the plurality of flywheel masses,
an angular difference ($\Delta\phi_{12}$) between two flywheel masses of the plurality of flywheel masses,
a torsional velocity ($\omega_1$, $\omega_2$, $\omega_3$) of at least one flywheel mass of the plurality of flywheel masses, or
a difference of torsional velocities ($\Delta\omega_{12}$) between two flywheel masses of the plurality of flywheel masses.

5. The method according to claim 3, wherein the at least one observer is embodied in a linear fashion and a non-linear behavior of the torque transmission device is reconstructed via a non-linear estimation or a non-linearity is compensated by a decoupling of the disturbances.

6. The method according to claim 5, further comprising performing an estimation of non-linear torsional parameters of the torque transmission device via a neuro-fuzzy system using the torsional parameters of two flywheel masses of the plurality of flywheel masses.

7. The method according to claim 5, further comprising performing an estimation via a harmonically activated neural network based on the torsional parameters at the output or a rotor of the electric machine.

8. The method according to claim 5, the at least one observer further comprises a mean proportional-integral observer performing an estimation of the disturbances via the mean proportional-integral observer of two torsional parameters at an output side.

9. The method according to claim 1, further comprising determining at least one parameter relevant for torsional vibrations of the internal combustion engine induced torque ($M_{ind}$) and using this as an input parameter for preliminary control of the induced torque ($M_{ind}$) in the at least one observer.

10. A method for damping vibrations in a drive train comprising:
providing:
an electric machine;
a torque transmission device comprising a flywheel mass with a moment of inertia;
a state controller for controlling the electric machine to provide a compensation torque to compensate torsional vibrations; and,
an observer for detecting a rotational velocity or a rotational angle of the drive train;
arranging the torque transmission device between an input shaft of a transmission and a crankshaft of an internal combustion engine;
reconstructing torsional parameters of the flywheel mass using:
the rotational velocity or the rotational angle;
a load torque at an output of the torque transmission device estimated by the observer; and,
an induced torque from the internal combustion engine transmitted via the torque transmission device; and,
using the torsional parameters as input parameters of the state controller.

* * * * *